United States Patent
Hogan et al.

(10) Patent No.: US 9,387,437 B2
(45) Date of Patent: Jul. 12, 2016

(54) REDUCTANT SUPPLY SYSTEM

(71) Applicants: Keith D. Hogan, Peoria, IL (US);
Thomas R. Fenelon, Chillicothe, IL
(US); Brian M. Cole, Peoria, IL (US);
Kevin L. Dea, Morton, IL (US)

(72) Inventors: Keith D. Hogan, Peoria, IL (US);
Thomas R. Fenelon, Chillicothe, IL
(US); Brian M. Cole, Peoria, IL (US);
Kevin L. Dea, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/283,860

(22) Filed: May 21, 2014

(65) Prior Publication Data
US 2015/0336052 A1    Nov. 26, 2015

(51) Int. Cl.
*B01D 53/94* (2006.01)
*F01N 3/20* (2006.01)
*F01N 3/021* (2006.01)

(52) U.S. Cl.
CPC ............. *B01D 53/94* (2013.01); *B01D 53/9431* (2013.01); *F01N 3/021* (2013.01); *F01N 3/20* (2013.01); *F01N 3/2066* (2013.01); *Y10T 137/3112* (2015.04); *Y10T 137/86324* (2015.04)

(58) Field of Classification Search
CPC .. B01D 53/94; B01D 53/9431; F01N 3/2066; F01N 3/021; Y10T 137/3112; Y10T 137/86324
USPC ......... 137/206, 207, 209, 212, 590, 210, 211, 137/211.5, 83, 565.22, 587
See application file for complete search history.

(56) References Cited

U.S. PATENT DOCUMENTS

| | | | |
|---|---|---|---|
| 3,941,509 A | 3/1976 | Gillilan et al. | |
| 4,052,852 A | 10/1977 | Hart | |
| 4,162,615 A | 7/1979 | Grattapaglia et al. | |
| 5,605,042 A * | 2/1997 | Stutzenberger | B01D 53/9431 60/286 |
| 7,818,961 B2 | 10/2010 | Leonard | |
| 8,015,801 B2 | 9/2011 | Oberski et al. | |
| 8,083,105 B2 | 12/2011 | Reichert et al. | |
| 8,359,834 B2 | 1/2013 | Gaudin et al. | |
| 8,393,142 B2 * | 3/2013 | Mupparapu | F01N 3/10 137/565.01 |
| 8,459,012 B2 | 6/2013 | Sun et al. | |
| 8,549,842 B2 | 10/2013 | Park | |
| 8,662,098 B2 * | 3/2014 | Foster | E03B 7/12 137/209 |
| 8,920,757 B1 * | 12/2014 | Chandrapati | B01D 53/9495 422/105 |
| 2003/0033799 A1 | 2/2003 | Scheying | |
| 2013/0000743 A1 | 1/2013 | Crary | |
| 2013/0055701 A1 * | 3/2013 | Yan | F01N 3/208 60/287 |
| 2013/0343959 A1 * | 12/2013 | Golin | F01N 3/103 422/170 |

FOREIGN PATENT DOCUMENTS

| | | |
|---|---|---|
| EP | 1222371 | 12/2004 |
| EP | 1612381 | 1/2006 |

* cited by examiner

*Primary Examiner* — Mary McManmon
*Assistant Examiner* — Patrick Williams (57) ABSTRACT

A reductant supply system includes a reductant tank, an injector supply conduit fluidly connecting the reductant tank with an injector, a driving fluid source in fluid communication with the reductant tank via a dose driving conduit, a purge conduit in fluid communication with the driving fluid source and the reductant tank, and a valve in fluid communication with the reductant tank via the dose driving conduit and the purge conduit.

19 Claims, 5 Drawing Sheets

REDUCTANT SUPPLY SYSTEM

TECHNICAL FIELD

The present disclosure relates to an exhaust aftertreatment system, and more particularly to an exhaust aftertreatment system including a reductant tank and a reductant injector.

BACKGROUND

An exhaust aftertreatment system associated with an engine may include a reductant supply system for delivery of a reductant into an exhaust stream of the engine. The reductant supply system may include a tank for storing the reductant, a pump, a reductant injector, and reductant delivery conduits. The reductant delivery conduits may fluidly connect various components of the reductant supply system for flowing the reductant therethrough. The reductant from the tank may be supplied to the reductant injector via the pump.

Some quantity of the reductant may be retained within components of the reductant supply system located downstream of the reductant tank with respect to a reductant flow direction after an engine shutdown. The reductant is susceptible to freezing in cold environments. For machines operating in relatively cold environments, the reductant contained within the components of the reductant supply system may freeze, which may in turn affect performance of the aftertreatment system. Therefore, aftertreatment systems may benefit from an ability to purge the components of the reductant supply.

U.S. Patent Publication Number 2013/0000743 (hereinafter the '743 publication) describes a selective catalytic reduction system that includes a fluid distribution system for supplying an exhaust gas reducing agent. The system includes a liquid storage tank and a fluid distribution module with a fluid pump that draws liquid reducing agent from the tank volume and provides the liquid at a module outlet port, while simultaneously discharging excess liquid from a circulation line outlet within the tank volume. The circulation line outlet of the '743 publication can be located at a bottom portion of the tank volume near other distribution module components to promote liquid circulation around the module components during a fluid distribution period, to promote thawing of frozen reducing agent at and around the module components, and to ensure a continuous supply of liquid to the fluid pump.

Fluid may be purged from components in the '743 publication by reversing an operating direction of the reductant pump. However, such a purge strategy does not apply to reductant supply systems that do not include a pump in contact with the reductant. Alternatively, fluid may be purged from components in the '743 publication by applying pressurized air to the system that drives a mixture of air and reductant through the pump and into the tank. However, the air purge strategy of the '743 publication calls for a separate pressurized air system in addition to the liquid pump, which may be expensive and complex. Hence, there is a need for an improved reductant supply and purging means in exhaust aftertreatment systems.

SUMMARY OF THE DISCLOSURE

In one aspect of the present disclosure, a reductant supply system includes a reductant tank, an injector supply conduit fluidly connecting the reductant tank with an injector, a driving fluid source in fluid communication with the reductant tank via a dose driving conduit, a purge conduit in fluid communication with the driving fluid source and the reductant tank, and a valve in fluid communication with the reductant tank via the dose driving conduit and the purge conduit. The valve is configured to effect fluid communication between the driving fluid source and the injector supply conduit via the dose driving conduit and block fluid communication between the driving fluid source and the injector supply conduit via the purge conduit. The valve is further configured to effect fluid communication between the driving fluid source and the injector supply conduit via the purge conduit and block fluid communication between the driving fluid source and the injector supply conduit via the dose driving conduit.

In another aspect of the present disclosure, a reductant supply system includes a reductant tank, an injector supply conduit fluidly connecting the reductant tank with an injector, a driving fluid source in fluid communication with the reductant tank via a dose driving conduit, a purge conduit in fluid communication with the driving fluid source and the injector supply conduit, and a valve in fluid communication with the reductant tank via the dose driving conduit and the injector supply conduit via the purge conduit. The valve is configured to effect fluid communication between the driving fluid source and the injector supply conduit via the dose driving conduit and block fluid communication between the driving fluid source and the injector supply conduit via the purge conduit. The valve is further configured to effect fluid communication between the driving fluid source and the injector supply conduit via the purge conduit and block fluid communication between the driving fluid source and the injector supply conduit via the dose driving conduit.

In yet another aspect of the present disclosure, a reductant supply system includes a reductant tank, an injector supply conduit fluidly connecting the reductant tank with an injector, a driving fluid source, and a valve arrangement in fluid communication with the driving fluid source and the reductant tank. The valve arrangement includes a first valve, a second valve, and a third valve. The valve arrangement is configured to selectively and alternatively deliver a driving fluid from the driving fluid source to the reductant tank via the first valve. The valve arrangement is also configured to selectively and alternatively purge the injector supply conduit with the driving fluid via the second valve. Further, the third valve is in fluid communication with the first valve and the second valve. The third valve is positioned downstream of the first valve and the second valve, such that the third valve is configured to control a flow of the driving fluid from the first valve towards the second valve during the delivery.

Other features and aspects of this disclosure will be apparent from the following description and the accompanying drawings.

DETAILED DESCRIPTION

Figure 1:
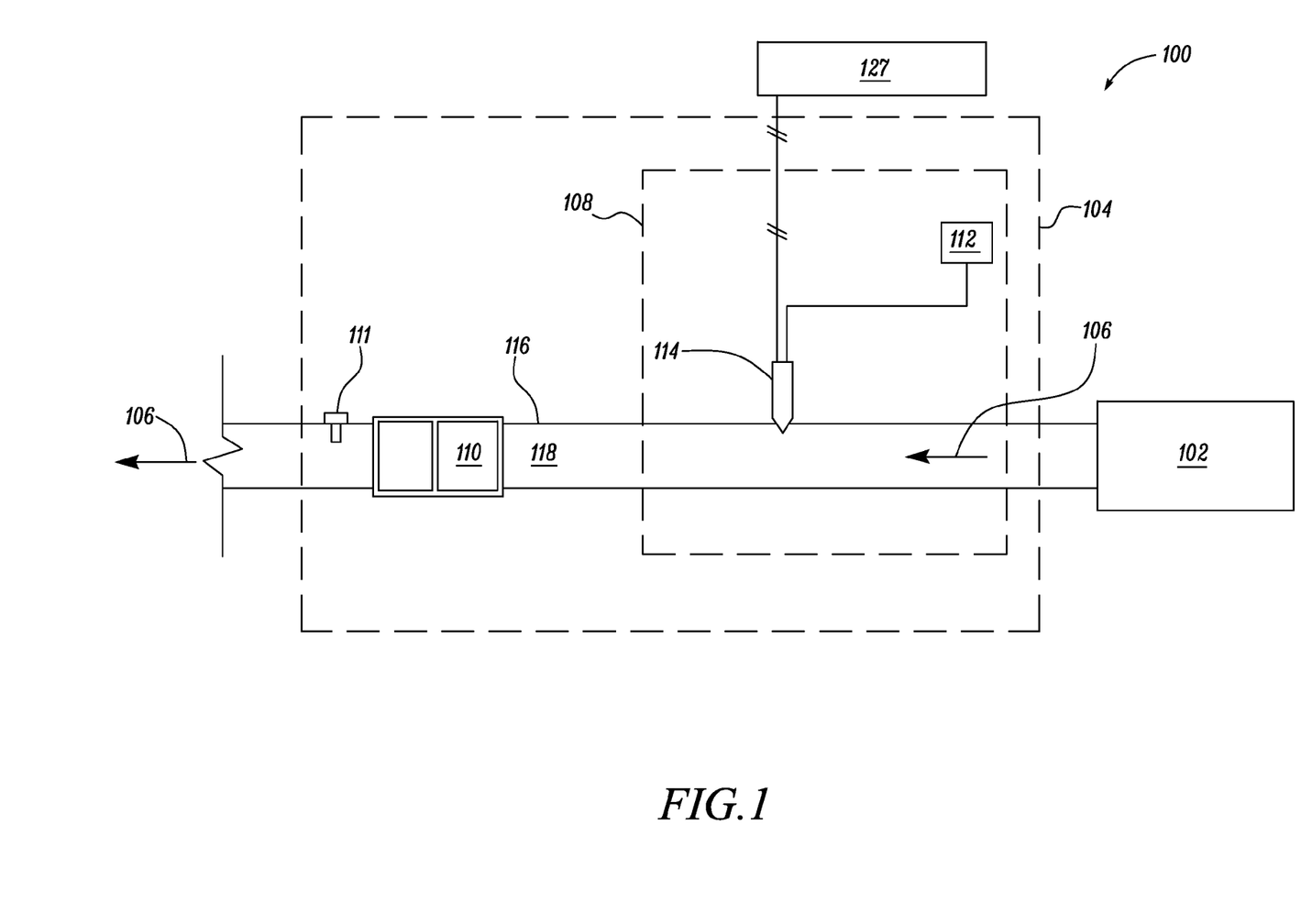
FIG. 1 is a block diagram of an exemplary engine system, according to an aspect of the disclosure.

Various aspects of the disclosure will now be described with reference to the drawings, wherein like reference numbers refer to like elements, unless specified otherwise. Referring to FIG. 1, a block diagram of an exemplary engine system 100 is illustrated, according to an aspect of the disclosure. The engine system 100 includes an engine 102, which may be an internal combustion engine such as a reciprocating piston engine or a gas turbine engine, for example. According to an aspect of the disclosure, the engine 102 is a spark ignition engine or a compression ignition engine such as a diesel engine, a homogeneous charge compression ignition engine, or a reactivity controlled compression ignition engine, or other compression ignition engine known in the art. The engine 102 may be fueled by gasoline, diesel fuel, biodiesel, dimethyl ether, alcohol, natural gas, propane, hydrogen, combinations thereof, or any other combustion fuel known in the art.

The engine 102 may include other components such as, a fuel system, an intake system, a drivetrain including a transmission system, and so on. The engine 102 may be used to provide power to any machine including, but not limited to, an on-highway truck, an off-highway truck, an earth moving machine, an electric generator, and so on. Further, the engine system 100 may be associated with an industry including, but not limited to, transportation, construction, agriculture, forestry, power generation, and material handling.

The engine system 100 includes an exhaust aftertreatment system 104 fluidly connected to an exhaust manifold of the engine 102. The aftertreatment system 104 is configured to treat an exhaust gas flow 106 exiting the exhaust manifold of the engine 102. The exhaust gas flow 106 contains emission compounds that may include Nitrogen Oxides (NOx), unburned hydrocarbons, particulate matter and/or other combustion products known in the art. The aftertreatment system 104 may be configured to trap or convert NOx, unburned hydrocarbons, particulate matter, combinations thereof, or other combustion products in the exhaust gas flow 106 before exiting the engine system 100.

The aftertreatment system 104 may include a reductant supply system 108. The reductant supply system 108 is configured to dispense a reductant in the exhaust gas flow 106. The aftertreatment system 104 may also include a Selective Catalytic Reduction (SCR) module 110 provided downstream of the reductant supply system 108. The SCR module 110 is configured to reduce a concentration of NOx in the exhaust gas flow 106. The SCR module 110 may include a catalyst for facilitating the reaction, reduction, or removal of NOx from the exhaust gas flow 106 passing through the SCR module 110. The SCR module 110 may have a honeycomb or other structure made from or coated with an appropriate material. The material may be an oxide, such as vanadium oxide or tungsten oxide, coated on an appropriate substrate, such as titanium dioxide. The SCR module 110 may have a monolithic structure or may include multiple banks based on system requirements.

According to an aspect of the disclosure, the aftertreatment system 104 may include a filter (not shown), such as, for example, a Diesel Particulate Filter (DPF), provided upstream of the SCR module 110. The DPF may be coated with a suitable catalyst to promote oxidation of any particulate matter in the exhaust gas flow 106 that may be trapped in the DPF. Additionally, in another aspect, the aftertreatment system 104 may further include a Diesel Oxidation Catalyst (DOC). In such an aspect, the DOC may be positioned upstream of the SCR module 110, in an exhaust flow direction. Alternatively, the aftertreatment system 104 may omit the DPF and include only the SCR module 110. In yet another aspect, a combined DPF/SCR catalyst (not shown) may be used.

Further, the aftertreatment system 104 may include one or more NOx sensors 111. The NOx sensors 111 may be located at varying locations within the aftertreatment system 104. For example, the NOx sensors 111 may be located upstream and/or downstream of the SCR module 110. The NOx sensors 111 may be configured to measure the concentration of NOx compounds in the exhaust gas flow 106 passing through the aftertreatment system 104. Similarly, other additional sensors, such as, a pressure sensor and a temperature sensor may also be included in contact with the exhaust gas flow 106 without any limitation.

The aftertreatment system 104 disclosed herein is provided as a non-limiting example. It will be appreciated that the aftertreatment system 104 may be disposed in various arrangements and/or combinations relative to the exhaust manifold. These and other variations in aftertreatment system design are possible without deviating from the scope of the disclosure.

As shown in FIG. 1, the reductant supply system 108 includes a reductant tank 112 and an injector 114 for supplying the reductant in an exhaust conduit 116 of the engine system 100. The reductant tank 112 is provided in fluid communication with the injector 114. The reductant tank 112 is configured to store the reductant therein. The reductant may be a fluid, such as, Diesel Exhaust Fluid (DEF). Alternatively, the reductant may include urea, ammonia, or other reducing agent known in the art. Parameters related to the reductant tank 112 such as size, shape, location, and material used may vary according to system design and requirements.

The exhaust conduit 116 is fluidly connected to the exhaust manifold of the engine 102, the injector 114, and the SCR module 110. The exhaust conduit 116 is configured to provide a passage 118 for the exhaust gas flow 106 therethrough. The injector 114 is configured to dispense the reductant into the exhaust gas flow 106. In an aspect of the disclosure, the reductant supply system 108 may include one or more pairs of the injectors 114 (see FIGS. 2-5). The number of the injectors 114 may vary based on the type of application.

Figure 2:
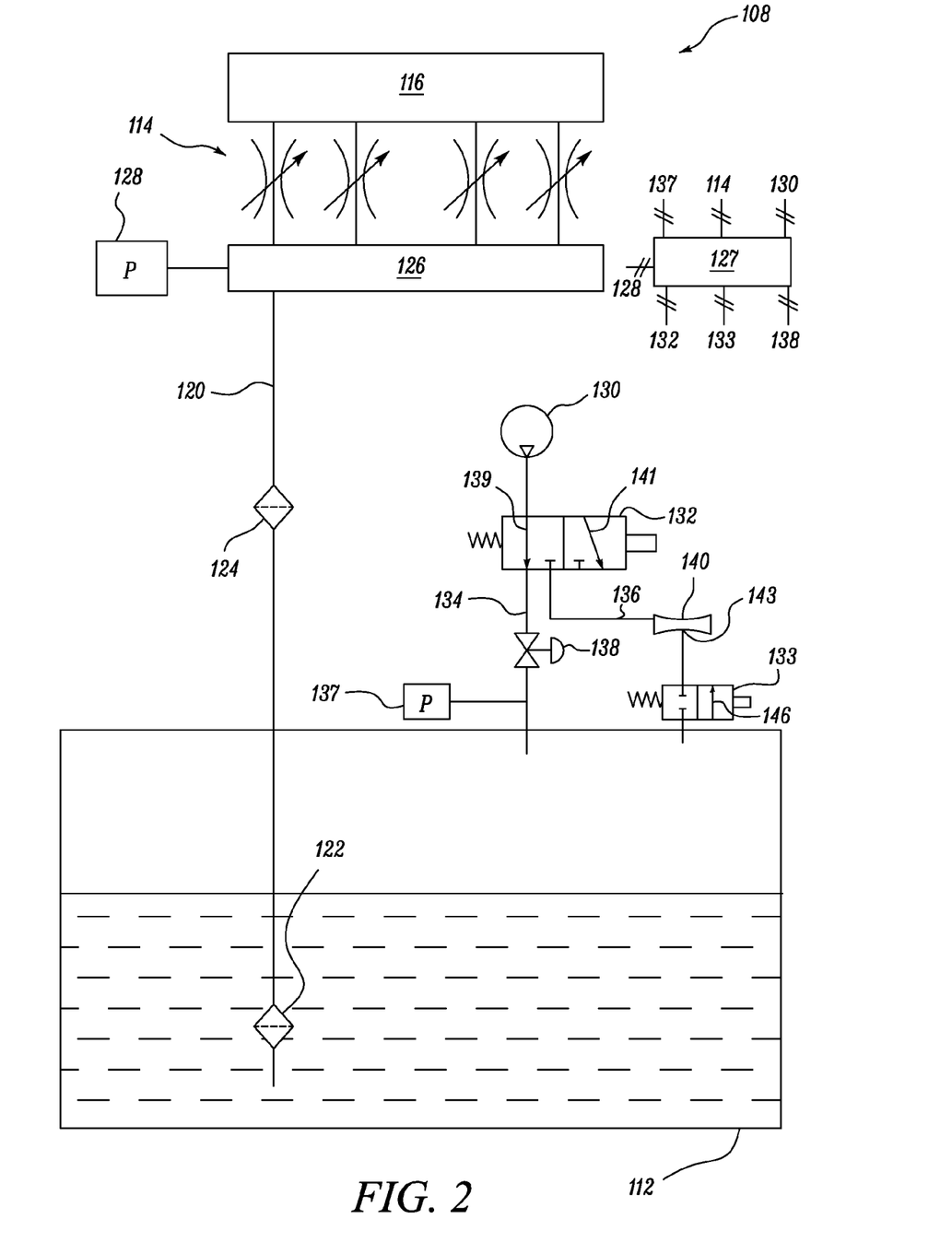
FIG. 2 is a schematic view of a reductant supply system associated with an aftertreatment system of the engine system, according to an aspect of the disclosure.

FIG. 2 is a schematic view of the reductant supply system 108, according to an aspect of the disclosure. An injector supply conduit 120 is arranged and configured to fluidly connect the reductant tank 112 and the injectors 114 such that the reductant drawn from the reductant tank 112 may be delivered to the injectors 114 via the injector supply conduit 120. An in-tank filter 122 is provided within the reductant tank 112. The in-tank filter 122 may include, for example, a sock filter or other filter configuration known in the art. An in-line filter 124 may be disposed in the injector supply conduit 120. More particularly, the in-line filter 124 is positioned between the injector 114 and the reductant tank 112. The in-line filter 124 disclosed herein may be any type of filter known to a person of ordinary skill in the art.

The injector supply conduit 120 may be fluidly connected to a pressure manifold 126 associated with the injectors 114. The pressure manifold 126 is provided downstream of the reductant tank 112 and the in-line filter 124. The pressure manifold 126 is configured to collect the reductant received from the reductant tank 112 and distribute the reductant to the injectors 114. During a dosing operation, a controller 127 may send a control signal to open the injectors 114 for a predetermined time period in order to allow the reductant to be injected into the exhaust gas flow 106. An injector pressure sensor 128 may be connected to the pressure manifold 126. The injector pressure sensor 128 is configured to generate and send a signal indicative of an injection pressure of the injectors 114 to the controller 127.

A driving fluid source 130 is provided in fluid communication with the reductant tank 112. The driving fluid source 130 is configured to supply a driving fluid. In an aspect of the disclosure, the driving fluid source 130 may include an air compressor for delivering pressurized air, a storage pressure vessel, or combinations thereof. The air compressor may be any type of known positive displacement compressor or a turbo machine. Alternatively, the driving fluid source 130 may be any other component serving the purpose of supplying a pressurized source of the driving fluid.

A valve 132 is provided downstream of the driving fluid source 130. The valve 132 is configured to fluidly connect the driving fluid source 130 with the reductant tank 112 via a dose driving conduit 134 or a purge conduit 136, depending on a configuration of the valve 132. The valve 132 disclosed herein may be any type of a known 3-way, 2-position valve configured to connect the driving fluid source 130 to the dose driving conduit 134 or the purge conduit 136. In one example, the valve 132 may be a 3-way, 2-position ball valve. Alternatively, the valve 132 may be a 3-way, 3-position valve.

During a reductant dosing operation, the valve 132 may be in a first configuration such that the valve 132 effects fluid communication between the driving fluid source 130 and the reductant tank 112 through the dose driving conduit 134 via a valve passage 139. Further, in this configuration, the valve 132 is configured to block fluid communication between the driving fluid source 130 and the injector supply conduit 120 via the purge conduit 136. During a purge operation, the valve 132 may be in a second configuration such that the valve 132 is configured to effect fluid communication between the driving fluid source 130 and the reductant tank 112 via the purge conduit 136 and a valve passage 141, and block fluid communication between the driving fluid source 130 and the reductant tank 112 via the dose driving conduit 134. Actuation of the valve 132 between the first and second configurations may be done manually or through the controller 127. The controller 127 may actuate the valve 132 via an electrical actuator, such as a solenoid, a pneumatic actuator, a hydraulic actuator, or other actuator known in the art. The reductant delivery and purge operations will be explained in detail later in this section.

The dose driving conduit 134 and the purge conduit 136 may be connected to a top portion of the reductant tank 112 with respect to gravity. A reductant tank pressure sensor 137 may be connected to the dose driving conduit 134 and upstream of the reductant tank 112. Further, the reductant tank pressure sensor 137 may be operatively coupled to the controller 127. The reductant tank pressure sensor 137 is configured to measure the pressure within the reductant tank 112.

Further, the dose driving conduit 134 may include a pressure regulator 138 connected downstream of the valve 132, and in association with the reductant tank 112. The pressure regulator 138 is configured to, at least in part, mitigate high pressure spikes in the reductant tank 112. In one aspect, the pressure regulator 138 may be an electrically controlled pressure regulator in operative communication with the controller 127.

The purge conduit 136 may include a venturi 140 connected upstream of the reductant tank 112. An upstream side of the venturi 140 is fluidly connected to the valve 132. The venturi 140 may include a converging-diverging nozzle or any other device known in the art for creating suction from a fluid flow. Further, a suction port 143 of the venturi 140 is fluidly connected to a valve element 133. The valve element 133 is provided in series fluid communication with the purge conduit 136, such that the valve element 133 is located downstream of the valve 132 and upstream of the reductant tank 112. Operation of the valve element 133 may be used to apply suction to the reductant tank 112. The valve element 133 may be embodied as a 2-way valve.

During an operational state of the engine 102, the reductant supply system 108 may inject or dose a desired amount of the reductant into the exhaust gas flow 106. The injector 114 may receive the reductant from the reductant tank 112. As shown in FIG. 2, the valve 132 is in the first configuration. The driving fluid source 130 is configured to introduce the driving fluid into the reductant tank 112 through the valve 132 via the dose driving conduit 134.

The driving fluid may pressurize the reductant tank 112 to a given pressure. It should be noted that during the dosing operation based on control signals received from the controller 127, the valve element 133 is in a closed position, so that pressure may build up in the reductant tank 112. In one aspect, this pressure of the reductant tank 112 may be approximately equal to a pressure at which the reductant is introduced by the injectors 114 into the exhaust gas flow 106. The controller 127 associated with the reductant supply system 108 may be configured to sense the pressure of the pressure manifold 126 and/or the injection pressure of the injector 114 via the injector pressure sensor 128. The controller 127 may be further configured to regulate an operation of the driving fluid source 130 or the operation of the valve 132 in order to control a quantity of the driving fluid being introduced into the reductant tank 112.

The driving fluid introduced within the reductant tank 112 may increase a pressure of the reductant tank 112, further causing the reductant present in the reductant tank 112 to enter into the injector supply conduit 120. The reductant may flow through the in-tank and in-line filters 122, 124, and flow into the pressure manifold 126. The reductant may further be introduced by the injectors 114 into the exhaust conduit 116.

Some quantity of the reductant may be retained in components of the aftertreatment system 104. For example, the reductant may be retained in the reductant delivery lines, such as, the injector supply conduit 120. The purge conduit 136 of the reductant supply system 108 is configured to purge this reductant that is retained within the components of the aftertreatment system 104. The purge operation will now be explained in detail.

During the purge operation, the valve 132 is in the second configuration, such that the venturi 140 is in fluid communication with the driving fluid source 130 via the valve passage 141, and the valve element 133 is in an open position, such that the reductant tank 112 is in fluid communication with the suction port 143 of the venturi 140 via a valve passage 146. On actuation of the driving fluid source 130, the driving fluid is delivered to the venturi 140 of the purge conduit 136 via the valve passage 141. Suction generated at the suction port 143 of the venturi 140 may cause the driving fluid collected in the top portion of the reductant tank 112 to be drawn into the valve passage 146 and vented outside the reductant tank 112. A negative pressure may be created within the reductant tank 112, thereby drawing fluid from flow passages of the reductant supply system 108 into the reductant tank 112. For example, reductant present in the injector supply conduit 120 may be drawn into the reductant tank 112 by suction generated at the venturi 140, thereby purging the injector supply conduit 120.

Figure 3:
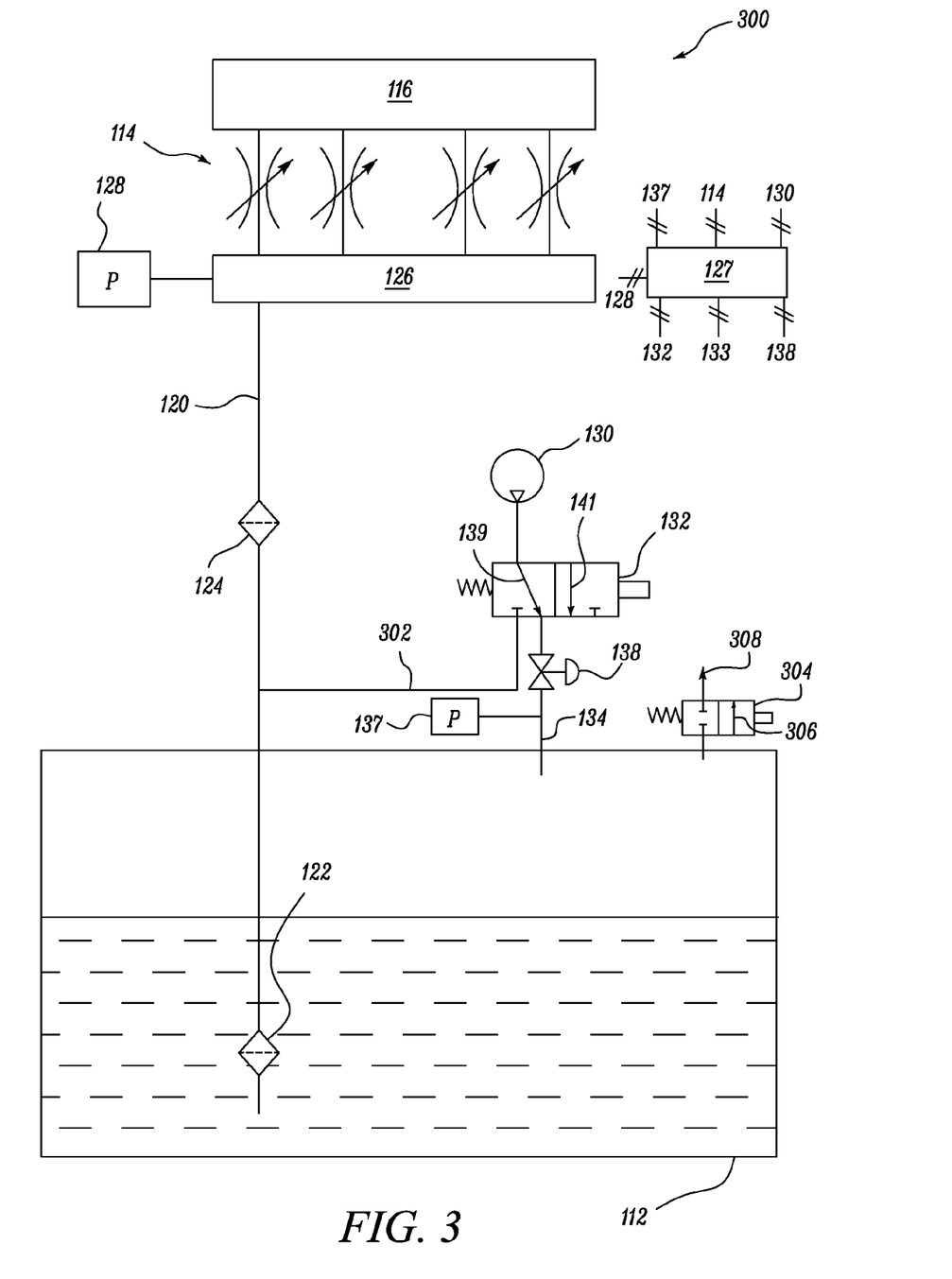
FIG. 3 is a schematic view of a reductant supply system, according to an aspect of the disclosure.

FIG. 3 illustrates another aspect of the disclosure. In this aspect, one end of the purge conduit 302 of the reductant supply system 300 is connected to the valve 132 and another end is connected to the injector supply conduit 120. Further, a valve element 304 may be connected to the top portion of the reductant tank 112 with respect to gravity. The valve element 304 may be embodied as a 2-way valve. The valve element 304 is operatively coupled to the controller 127. The valve element 304 may include a valve passage 306.

During the dosing operation, the valve 132 is in the first configuration, such that the driving fluid source 130 is in fluid communication with the reductant tank 112 via the valve passage 139. Also, based on control signals received from the controller 127, the valve element 304 is in a closed position. As the driving fluid is introduced into the reductant tank 112, the closed position of the valve element 304 may allow pressure to build up in the reductant tank 112. The reductant may be introduced into other parts of the reductant supply system 300 in a manner similar to that as described earlier in this section in connection with FIG. 2.

During the purge operation, the valve element 304 is actuated by the controller 127 and operates in an open position. As shown by an arrow 308, the valve element 304 may release the pressure built up within the reductant tank 112 and vent the same to the atmosphere via the valve passage 306. When the pressure in the reductant tank 112 reaches a predetermined pressure value, for example, approximately 50 kPa, the valve 132 is actuated by the controller 127 to operate in the second configuration. It should be noted that the valve 132 may be operated in the second configuration for a predetermined time period or until negative pressure is created within the reductant tank 112. The controller 127 may send control signals to close the valve 132 thereafter. In this configuration of the valve 132, the driving fluid source 130 is fluidly connected to the injector supply conduit 120 via the valve passage 141.

The controller 127 may actuate the driving fluid source 130, causing the driving fluid to be introduced into the purge conduit 302 via the valve passage 141 of the valve 132. The driving fluid may further flow through the injector supply conduit 120. While flowing through the injector supply conduit 120, the pressurized driving fluid may push or flush out the fluid, such as, the reductant retained within the injector supply conduit 120, causing the fluid to enter into other components of the aftertreatment system 104 positioned downstream of the injector supply conduit 120 with respect to the reductant flow direction. For example, the driving fluid and the reductant may flow into the pressure manifold 126 and further into the injectors 114.

Figure 4:
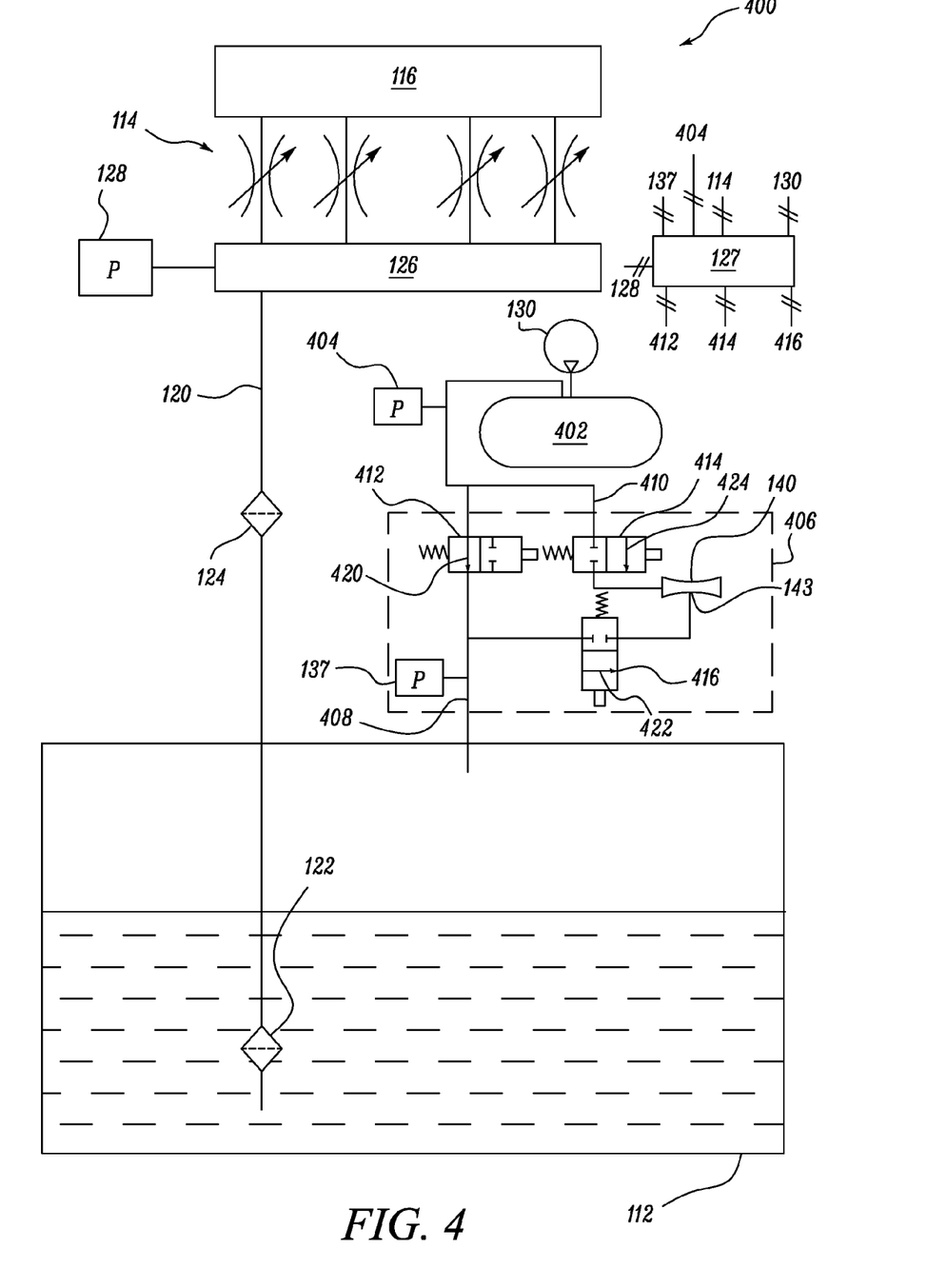
FIG. 4 is a schematic view of a reductant supply system, according to an aspect of the disclosure.

FIG. 4 illustrates yet another aspect of the disclosure. In this aspect, a tank 402 is provided in fluid communication with the driving fluid source 130. The tank 402 is configured to store the driving fluid therein. A tank pressure sensor 404 may be provided in association with the tank 402, in order to measure a pressure within the tank 402. The tank pressure sensor 404 is operatively coupled to the controller 127. Regulation of the tank 402 by the controller 127 may be based on the tank pressure sensed by the tank pressure sensor 404. Accordingly, the controller 127 may actuate the driving fluid source 130.

A valve arrangement 406 may be provided in fluid communication with the driving fluid source 130 and the reductant tank 112. The valve arrangement 406 may fluidly connect the tank 402 and the reductant tank 112 either via the dose driving conduit 408 or via the purge conduit 410. The valve arrangement 406 includes a first valve 412, a second valve 414, and a third valve 416. In one example, each of the valves 412, 414, 416 is embodied as a 2-way valve. The valves 412, 414, 416 may be check valves that allow fluid flow in only a single direction. The valves 412, 414, 416 are operatively coupled to the controller 127.

The first valve 412 includes a valve passage 420 through which the first valve 412 may be fluidly connected to the reductant tank 112 via the dose driving conduit 408. The second and third valves 414, 416 include valve passages 424, 422 respectively through which the second and third valves 414, 416 are fluidly connected to the reductant tank 112 via the purge conduit 410. Both ends of the purge conduit 410 are connected to the dose driving conduit 408, such that one end is located upstream of the first valve 412 and the other end is located downstream of the first valve 412 with respect to the driving fluid flow direction. The venturi 140 is positioned in the purge conduit 410, such that the venturi 140 is located between the second and third valves 414, 416. The upstream side of the venturi 140 is in fluid communication with the second valve 414, while the suction port 143 of the venturi 140 is in fluid communication with the third valve 416. The other components of the reductant supply system 400 are as described in connection with previous figures. The working of the valve arrangement 406 will now be discussed in detail.

During the dosing operation, the controller 127 is configured to send control signals to the first valve 412, in order to actuate and operate the first valve 412 in an open position. The first valve 412 of the valve arrangement 406 is configured to effect fluid communication between the driving fluid source 130 and the reductant tank 112 via the valve passage 420. The second and third valves 414, 416 are in a closed position, thereby blocking the flow of the driving fluid via the valve passages 424, 422 respectively.

The driving fluid from the driving fluid source 130 may pass through the valve passage 420 of the first valve 412, and further be introduced into the reductant tank 112 via the dose driving conduit 408. As stated earlier, in this aspect, the third valve 416 is in the closed position and is configured to block flow of the driving fluid toward the second valve 414 during the dosing operation. The driving fluid introduced into the reductant tank 112 may cause the pressure of the reductant tank 112 to increase. The increase in pressure of the reductant tank 112 may further cause the reductant present in the reductant tank 112 to enter into the injector supply conduit 120.

Further, during the purge operation, the first valve 412 is in a closed position based on control signals received from the controller 127. The controller 127 may send control signals to the third valve 416 to actuate and operate the third valve 416 in an open position. The third valve 416 may release the pressure built up within the reductant tank 112 via the valve passage 422 and vent the same to the atmosphere through the venturi 140. When the pressure in the reductant tank 112 reaches the predetermined pressure value, the controller 127 may send control signals to the second valve 414 in order to actuate and operate the second valve 414 in an open position.

On the opening of the second valve 414 the driving fluid flows via the valve passage 424 into the purge conduit 410, and to the upstream side of the venturi 140. The suction created at the suction port 143 of the venturi 140 may cause the driving fluid or air collected in the top portion of the reductant tank 112 to be drawn through the valve passage 422 of the third valve 416 to flow toward the venturi 140 and thereafter be vented to the atmosphere therefrom. This may create a negative pressure in the reductant tank 112, causing the reductant retained within the injector supply conduit 120 to be drawn into the reductant tank 112. It should be noted that the second valve 414 of the valve arrangement 406 may be operated in the open position for the predetermined time period or until negative pressure is created within the reductant tank 112. The controller 127 may then send control signals to close the second valve 414.

Figure 5:
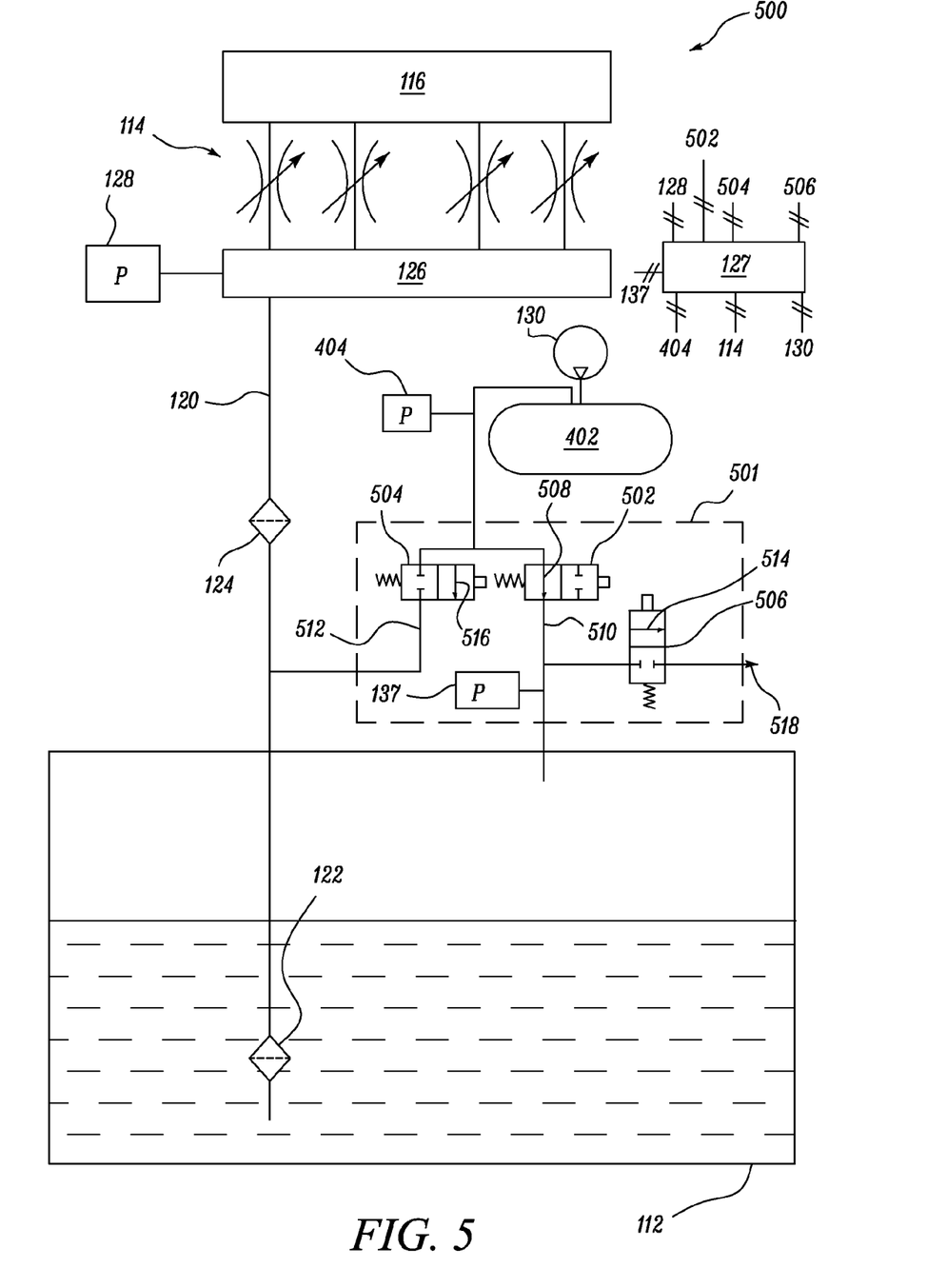
FIG. 5 is a schematic view of a reductant supply system, according to an aspect of the disclosure.

FIG. 5 illustrates another aspect of the disclosure. The valve arrangement 501 includes the first valve 502, the second valve 504, and the third valve 506. The first valve 502 fluidly connects the tank 402 and the reductant tank 112 via the valve passage 508. The first valve 502 is present in the dose driving conduit 510. The second valve 504 includes the valve passage 516. The valve passage 516 fluidly connects the tank 402 and the injector supply conduit 120 based on the position of the second valve 504. Further, the third valve 506 is in fluid communication with the dose driving conduit 510, such that the third valve 506 is positioned downstream of the first valve 502 and upstream of the reductant tank 112. The third valve 506 includes the valve passage 514. The valves 502, 504, and 506 are operatively coupled to the controller 127. The other components of the reductant supply system 500 are as described in connection with previous figures.

During the dosing operation, the controller 127 may send control signals to the first valve 502 in order to actuate and operate the first valve 502 in the open position. The driving fluid from the driving fluid source 130 may then be introduced through the valve passage 508 and into the reductant tank 112. The second and third valves 504, 506 are in the closed position based on control signals received from the controller 127. The dosing operation is similar to that described in connection with FIG. 4.

During the purging operation, the controller 127 may send control signals to actuate and operate the third valve 506 in the open position to vent the pressure built up in the reductant tank 112 to the atmosphere via the valve passage 514. The first valve 502 is in the closed position based on control signals received from the controller 127. After the predetermined pressure value is reached, the controller 127 may cause the second valve 504 to change to the open position. The driving fluid may then enter into the injector supply conduit 120 via the valve passage 516, in order to purge the injector supply conduit 120. The purge operation is carried out in a manner similar to that explained in connection with FIG. 3.

INDUSTRIAL APPLICABILITY

The design of the reductant supply system 108, 300, 400, 500 disclosed herein allows for a simpler filtration system, higher altitude capability, reduction in number of parts that contact the reductant, and overall fewer parts in the reductant supply system 108, 300, 400, 500.

As explained above, the driving fluid source 130 of the reductant supply system 108, 300, 400, 500 described herein may pressurize and introduce the driving fluid into the reductant tank 112, via the dose driving conduit 134, 408, 510. The driving fluid introduced within the reductant tank 112 may increase the pressure of the reductant tank 112, up to the injection pressure, leading to the delivery of the reductant from the reductant tank 112 to the injectors 114 for the dosing of the reductant. Hence, the pumping functionality offered by traditional pump units may be performed by the components of the reductant supply system 108, 300, 400, 500.

During the purge operation the negative pressure created within the reductant tank 112 causes the retained reductant in the components of the reductant supply system 108, 300, 400, 500 downstream of the reductant tank 112 to be drawn into the reductant tank 112. The purging of the retained reductant may prevent a failure of the components of the reductant supply system 108, 300, 400, 500. If not purged, the retained reductant may accumulate and freeze within the components of the reductant supply system 108, 300, 400, 500. The purging of the reductant supply system 108, 300, 400, 500 may allow the reductant supply system 108, 300, 400, 500 to dose at a faster rate, as compared to if the reductant needed to be thawed just prior to the dosing operation. The reductant supply system 108, 300, 400, 500 is easy to implement and is cost effective. Moreover, the reductant supply system 108, 300, 400, 500 may require less installation space due to usage of components that are compact in design.

Although the valves 132, 133, 304, 412, 414, 416, 502, 504, 506 are represented in the drawings a having a single actuator with a spring return, it will be appreciated that any of these valves could include double acting actuators, or any other valve actuators known to persons having skill in the art. Further, actuators on any of the valves 132, 133, 304, 412, 414, 416, 502, 504, 506 could be an electrical actuator, such as a solenoid, a pneumatic actuator, a hydraulic actuator, or other actuator known to persons having skill in the art, where such actuators may be actuated through operative communication with the controller 127. Moreover, it will be appreciated that the controller 127 is capable of affecting any functions of the reductant supply system 108, 300, 400, 500 disclosed herein or otherwise known in the art.

While aspects of the disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the disclosure as determined based upon the claims and any equivalents thereof.

What is claimed is:

1. A reductant supply system comprising:
a reductant tank;
an injector supply conduit fluidly connecting the reductant tank with an injector;
a driving fluid source in fluid communication with the reductant tank via a dose driving conduit;
a purge conduit in fluid communication with the driving fluid source and the reductant tank;
a venturi disposed in the purge conduit; and
a valve in fluid communication with the reductant tank via the dose driving conduit and the purge conduit, wherein:
a first configuration of the valve affects fluid communication between the driving fluid source and the injector supply conduit through the dose driving conduit and blocks fluid communication between the driving fluid source and the injector supply conduit through the purge conduit, and
a second configuration of the valve affects fluid communication between the driving fluid source and the injector supply conduit through the purge conduit and blocks fluid communication between the driving fluid source and the injector supply conduit through the dose driving conduit.

2. The reductant supply system of claim 1 further comprising:
a valve element disposed in the purge conduit, the valve element affecting selective fluid communication between the venturi and the reductant tank.

3. The reductant supply system of claim 1 further comprising:
a pressure sensor associated with the reductant tank.

4. The reductant supply system of claim 1 further comprising:
a pressure manifold in fluid communication with the injector and the injector supply conduit.

5. The reductant supply system of claim 4 further comprising:
an injector pressure sensor coupled to the pressure manifold.

6. The reductant supply system of claim 1, wherein the dose driving conduit and the purge conduit mare attached to a top portion of the reductant tank.

7. The reductant supply system of claim 1 further comprising:
a pressure regulator provided in the dose driving conduit, the pressure regulator positioned upstream of the reductant tank.

8. A reductant supply system comprising:
a reductant tank;
an injector supply conduit fluidly connecting the reductant tank with an injector;
a driving fluid source in fluid communication with the reductant tank via a dose driving conduit;
a purge conduit in fluid communication with the driving fluid source and the injector supply conduit;
a venturi disposed in the purge conduit; and
a valve in fluid communication with the reductant tank via the dose driving conduit and the injector supply conduit via the purge conduit, wherein:
a first configuration of the valve affects fluid communication between the driving fluid source and the injector supply conduit through the dose driving conduit and blocks fluid communication between the driving fluid source and the injector supply conduit through the purge conduit; and
a second configuration of the valve affects fluid communication between the driving fluid source and the injector supply conduit through the purge conduit and blocks fluid communication between the driving fluid source and the injector supply conduit through the dose driving conduit.

9. The reductant supply system of claim 8 further comprising:
a pressure sensor associated with the reductant tank.

10. The reductant supply system of claim 8 further comprising:
a valve element connected to a top portion of the reductant tank.

11. The reductant supply system of claim 8 further comprising:
a pressure regulator provided in the dose driving conduit, the pressure regulator positioned upstream of the reductant tank.

12. A reductant supply system comprising:
a reductant tank;
an injector supply conduit fluidly connecting the reductant tank with an injector;
a driving fluid source; and
a valve arrangement in fluid communication with the driving fluid source and the reductant tank, the valve arrangement including a first valve, a second valve, and a third valve, wherein the valve arrangement is configured to selectively and alternatively:
deliver a driving fluid from the driving fluid source to the reductant tank via the first valve; and
purge the injector supply conduit with the driving fluid via the second valve,
wherein the third valve is in fluid communication with the first valve and the second valve, the third valve positioned downstream of the first valve and the second valve, such that the third valve is configured to control a flow of the driving fluid from the first valve toward the second valve during the delivery.

13. The reductant supply system of claim 12 further comprising:
a pressure sensor associated with the reductant tank, the pressure sensor positioned between the valve arrangement and the reductant tank.

14. The reductant supply system of claim 12 further comprising:
a venturi in fluid communication with the second valve and third valve.

15. The reductant supply system of claim 12 further comprising:
a tank in fluid communication with the driving fluid source.

16. The reductant supply system of claim 15 further comprising:
a tank pressure sensor associated with the tank.

17. The reductant supply system of claim 12 further comprising:
an in-tank filter present within the reductant tank.

18. The reductant supply system of claim 12 further comprising:
a pressure manifold in fluid communication with the injector and the injector supply conduit.

19. The reductant supply system of claim 18 further comprising:
an injector pressure sensor coupled to the pressure manifold.

* * * * *